(12) United States Patent
Kataoka

(10) Patent No.: US 10,661,789 B2
(45) Date of Patent: May 26, 2020

(54) DRIVING SUPPORTER

(71) Applicant: TOYOTA JIDOSHA KABUSHIKI KAISHA, Toyota-shi, Aichi-ken (JP)

(72) Inventor: Hiroaki Kataoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 15/832,035

(22) Filed: Dec. 5, 2017

(65) Prior Publication Data

US 2018/0170370 A1 Jun. 21, 2018

(30) Foreign Application Priority Data

Dec. 21, 2016 (JP) .................. 2016-247831

(51) Int. Cl.
| | | |
|---|---|---|
| *B60W 30/00* | (2006.01) | |
| *B60W 30/09* | (2012.01) | |
| *B60W 30/12* | (2020.01) | |
| *B60W 40/04* | (2006.01) | |
| *B60W 30/18* | (2012.01) | |
| *B60W 30/10* | (2006.01) | |

(52) U.S. Cl.
CPC ............ *B60W 30/09* (2013.01); *B60W 30/10* (2013.01); *B60W 30/12* (2013.01); *B60W 30/18163* (2013.01); *B60W 40/04* (2013.01); *B60W 2554/00* (2020.02); *B60W 2554/80* (2020.02)

(58) Field of Classification Search
USPC ......................................................... 701/301
See application file for complete search history.

(56) References Cited

U.S. PATENT DOCUMENTS

| | | | |
|---|---|---|---|
| 2009/0011422 A1* | 1/2009 | Devor .................. | C12Q 1/6806 435/6.12 |
| 2010/0295668 A1* | 11/2010 | Kataoka ............... | B62D 15/025 340/435 |

FOREIGN PATENT DOCUMENTS

| | | |
|---|---|---|
| JP | 2010-271999 A | 12/2010 |
| WO | 2009/006446 A2 | 1/2009 |

* cited by examiner

*Primary Examiner* — James M McPherson
(74) *Attorney, Agent, or Firm* — Oliff PLC

(57) ABSTRACT

A driving supporter includes an environment obtainer and a support controller configured to control a supporting device to perform driving support such that an own vehicle travels along a target traveling line. The environment obtainer includes a relative-positional-relationship obtainer configured to obtain a relative positional relationship between the own vehicle and an object detected based on object information obtained by an object-information obtainer. The support controller includes an offset-target-traveling-line setter configured to set, when the relative positional relationship is a specific relationship in which it is estimated that a steering operation in a direction in which the own vehicle avoids the object is to be performed, the target traveling line to an offset position that is shifted in a direction identical to a direction of a steering operation from the target traveling line located when the relative positional relationship is not the specific relationship.

8 Claims, 10 Drawing Sheets

DRIVING SUPPORTER

CROSS REFERENCE TO RELATED APPLICATION

The present application claims priority from Japanese Patent Application No. 2016-247831, which was filed on Dec. 21, 2016, the disclosure of which is herein incorporated by reference in its entirety.

BACKGROUND

The following disclosure relates to a driving supporter configured to support driving such that a vehicle travels along a lane.

Patent Document 1 (WO 2009/006446) discloses a driving supporter configured to support driving such that a vehicle travels along a lane. This driving supporter sets a center line extending through a substantially center of the lane, to a target path and supports driving such that the vehicle travels along the target path.

SUMMARY

Accordingly, an aspect of the disclosure relates to improvement of a driving supporter, for example, reduction of a not-normal feeling given to a driver.

In a case where an object obtained by an environment obtainer is an object for which it is estimated that a steering operation is to be performed such that an own vehicle avoids the object, that is, in the case where the obtained object is a specific object, the present driving supporter changes a target traveling line and supports driving such that the own vehicle travels along the changed target traveling line. For example, in the case where the specific object is present, it is estimated that a steering operation is to be performed such that the own vehicle avoids the specific object. In the case where the own vehicle has deviated from the target traveling line, driving support is performed so as to apply steering torque in a direction in which the own vehicle is brought closer to the target traveling line in some cases. In these cases, a direction of the applied steering torque and a direction of the steering operation performed by the driver are reverse to each other, so that it is estimated that a not-normal feeling is given to the driver. In contrast, the present driving supporter changes the target traveling line in the direction of the steering operation performed by the driver and supports driving such that the own vehicle travels along the changed target traveling line. This processing makes it difficult for the driver to feel the not-normal feeling. Examples of the steering operation in the direction in which the own vehicle avoids the object include: a steering operation in a direction away from the object in the case where the object is present on a front lateral side of the own vehicle; and a steering operation for moving the own vehicle rightward or leftward to avoid the object in the case where the object is present in front of the own vehicle.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment by reference to the drawings.

Figure 1:
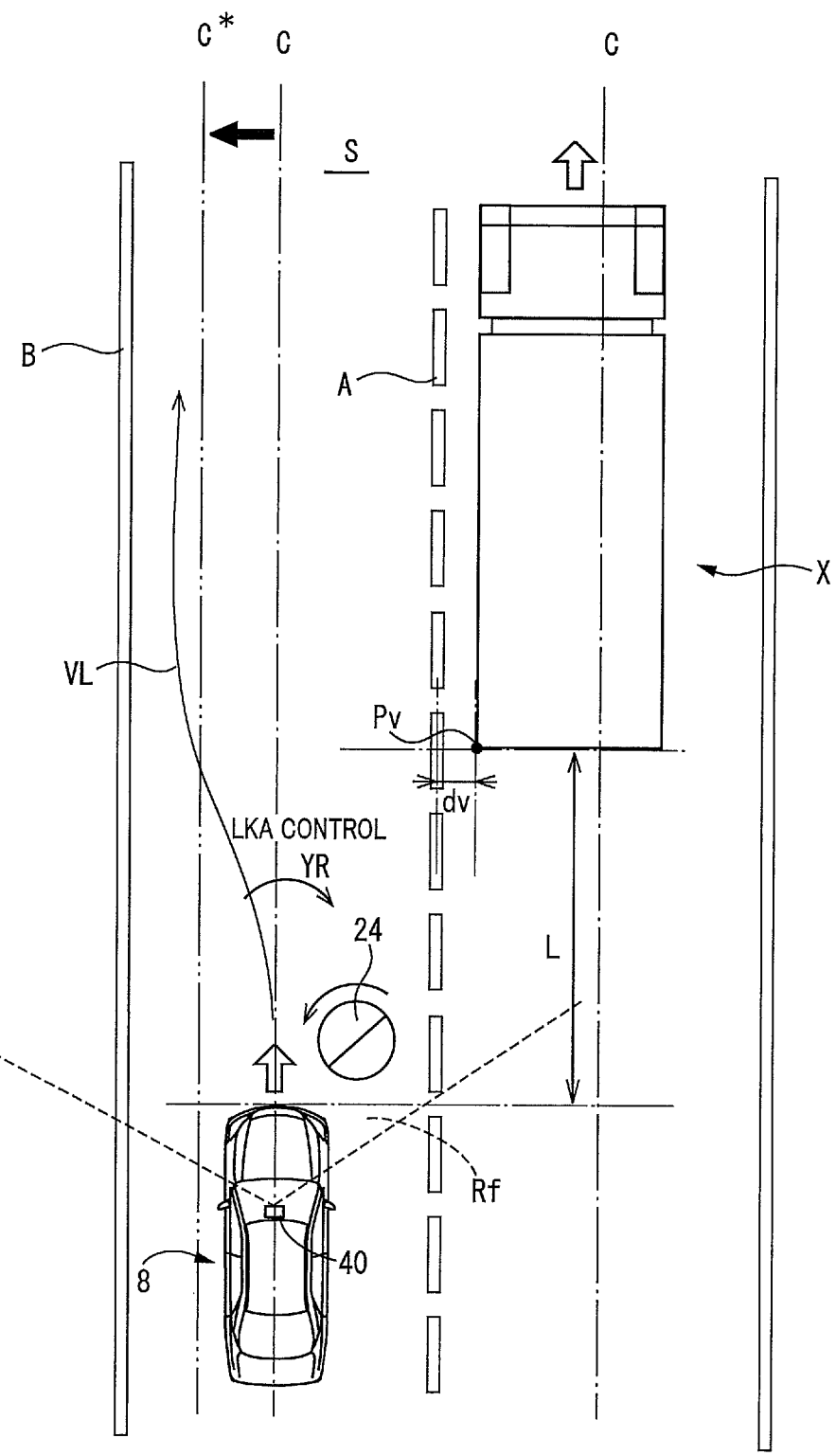
FIG. 1 is a view illustrating a relative positional relationship between an object and an own vehicle including a driving supporter according to one embodiment.
Figure 2:
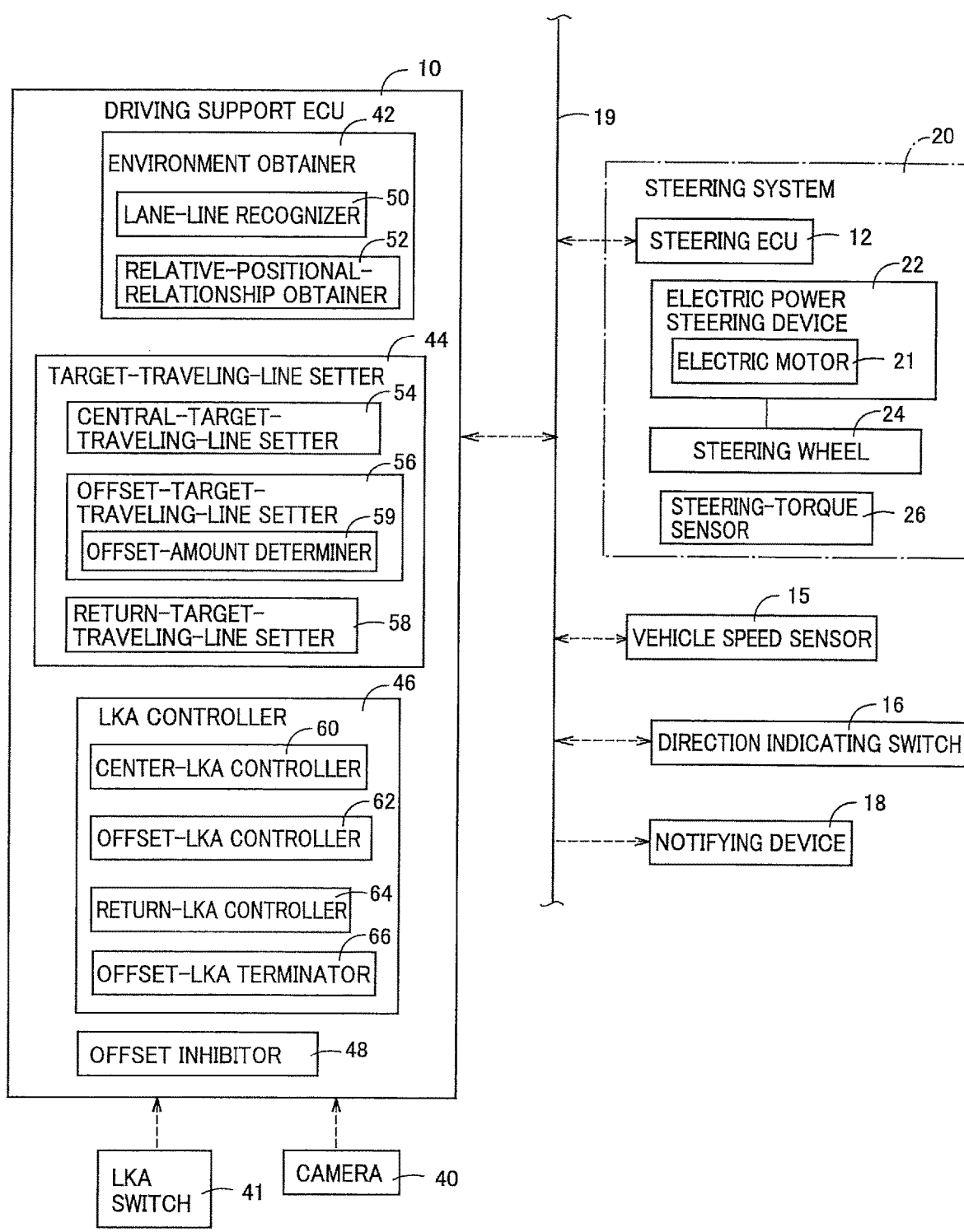
FIG. 2 is a block diagram conceptually illustrating the driving supporter.

A driving supporter according to the present embodiment is installed in an own vehicle 8 illustrated in FIG. 1. As illustrated in FIG. 2, the own vehicle 8 includes a driving-support electric control unit (ECU) 10, a steering ECU 12, a vehicle speed sensor 15, a direction indicating switch 16, and a notifying device 18. These devices are communicably connected to each other over a controller area network (CAN) 19. The vehicle speed sensor 15 detects a vehicle speed Vs based on wheel speeds of front left and right and rear left and right wheels of the own vehicle 8. The vehicle speed Vs is a running speed of the own vehicle 8. The direction indicating switch 16 is operable by the driver and indicates a direction of travel of the own vehicle 8 (which corresponds to a direction of a steering operation) when the steering operation is performed.

The steering ECU 12 is an element of a steering system 20 and principally constituted by a computer including an executer, a storage, and an input/output device. The steering system 20 includes: an electric power steering device 22 including an electric motor 21; a steering wheel 24 as a steering operation member; and a steering-torque sensor 26. The electric motor 21 and the steering-torque sensor 26 are connected to the input/output device of the steering ECU 12, for example.

The electric power steering device 22 is configured to turn steered road wheels by using (i) steering torque applied from a driver to a steering mechanism via the steering wheel 24 and (ii) steering torque applied from the electric motor 21 to the steering mechanism. The steering ECU 12 controls the electric motor 21 to control the steering torque applied to the steering mechanism. Examples of application of the steering torque to the steering mechanism include: application of the steering torque to the steering mechanism in the same direction as a direction of the steering operation performed by the driver; application of the steering torque to the steering mechanism in a direction reverse to the direction of the steering operation performed by the driver; and application of the steering torque to the steering mechanism without the steering operation of the driver.

The steering-torque sensor 26 is configured to detect steering torque applied from the driver via the steering wheel 24 to a torsion bar of the steering mechanism. The steering-torque sensor 26 outputs, as a positive value, steering torque applied by a turn of the steering wheel 24 in the right direction and outputs, as a negative value, steering torque applied by a turn of the steering wheel 24 in the left direction. In the present embodiment, when the steering torque in the right direction is applied, a steering-direction flag Fs is set to the right (Fs=2), and when the steering torque in the left direction is applied, the steering-direction flag Fs is set to the left (Fs=1). When no steering torque is applied in the right direction or the left direction, the steering-direction flag Fs is set to "0".

The notifying device 18 is configured to provide notification when the own vehicle 8 has deviated from a target traveling line Cref. The notifying device 18 may provide notification visually by using a display, a lamp, or the like, may provide notification by auditorily by using a beeper, a speaker, or the like, and may provide notification by using body sensation, for example, by vibrating the steering wheel 24 or a seatbelt, not illustrated, for example.

The driving support ECU 10 is principally constituted by a computer including an executer, not illustrated, a storage, and an input/output device. A camera 40 and a lane-keep-assist (LKA) switch 41 are connected to the input/output device, for example. The camera 40 is installed on a back surface of a front glass of the own vehicle 8 and capable of taking an image including an object and lane lines within a region Rf located on a front side and front lateral sides of the own vehicle 8. The LKA switch 41 is operable by the driver and turned on when the driver permits execution of LKA control as driving support.

The driving support ECU 10 includes an environment obtainer 42, a target-traveling-line setter 44, an LKA controller 46, and an offset inhibitor 48. In the present embodiment, the LKA controller 46 is configured to execute the LKA control to support driving of the own vehicle 8 traveling along the target traveling line Cref. In the LKA control, when the own vehicle 8 has deviated from the target traveling line Cref, steering torque in a direction in which the own vehicle 8 moves toward the target traveling line Cref is applied to the steering mechanism to support driving of the driver. The target traveling line Cref is in most cases set to a line C (hereinafter may be referred to as "center line") extending through a substantially center of an own lane S on which the own vehicle 8 is traveling (Cref=C). As illustrated in FIG. 1, however, in the case where there is an object X on a lane next to and to the right of the own lane S, for example, the driver in some cases performs a steering operation in the left direction to bring the own vehicle 8 away from the object X along a path VL and drive the own vehicle 8 on a portion of the own lane S which is farther from the object X than the other portion. If the LKA control is executed in this case, steering torque in the right direction indicated by arrow YR is applied to the steering mechanism by the electric motor 21. Since the direction of the steering operation performed by the driver (i.e., the left direction) and the direction of the applied steering torque are opposite to each other, a not-normal feeling is given to the driver (in other words, the driver feels something not normal). To solve this problem, in the present embodiment, in the case where the driver has performed the steering operation due to the presence of the object X in the direction in which the own vehicle 8 moves away from the object X, the target traveling line Cref is shifted in the same direction as that of the steering operation so as to be set to an offset position (Cref=C*).

The environment obtainer 42 is configured to obtain an environment in the region Rf and includes a lane-line recognizer 50 and a relative-positional-relationship obtainer 52.

The lane-line recognizer 50 is configured to recognize lane lines in the region Rf, based on the image taken by the camera 40. For example, as illustrated in FIG. 1, in the case where the own vehicle 8 is traveling on the own lane S, the lane-line recognizer 50 identifies lane lines A, B defining the own lane S from opposite sides thereof. The relative-positional-relationship obtainer 52 is configured to identify an object X based on the image taken by the camera 40 and obtain the relative positional relationship between the object X and the own vehicle 8. As a relative positional relationship between the own vehicle 8 and the object X, in the present embodiment, as illustrated in FIG. 1, the relative-positional-relationship obtainer 52 obtains: a vehicle-to-object distance L that is a distance between the own vehicle 8 and the object X in a front and rear direction which may be referred to as "running direction"; an object-side distance dv that is a distance between a predetermined reference point Pv in the object X and the lane line A defining the own lane S which is nearer to the object X than the lane line B, in a lateral direction of the own vehicle 8 which may be referred to as "widthwise direction"; a relative velocity; and a direction directed from the own vehicle 8 to the object X.

The vehicle-to-object distance L is a value obtained assuming that the own vehicle 8 and the object X are on the same lane. As illustrated in FIG. 1, the object-side distance dv takes a positive value when the predetermined reference point Pv in the object X is located outside the own lane S, that is, when the predetermined reference point Pv is located on an opposite side of the lane line A from the own lane S, for example. The object-side distance dv takes a negative value when the predetermined reference point Pv is located in the own lane S, that is, when the predetermined reference point Pv and the own lane S are located on the same side of the lane line A. The distance between the object X and the own vehicle 8 in the lateral direction becomes relatively smaller when the object-side distance dv is small than when the object-side distance dv is large. Thus, it is possible to consider that the object-side distance dv is a physical quantity representing a relative positional relationship between the own vehicle 8 and the object X in the lateral direction. The direction directed from the own vehicle 8 to the object X is a front-right direction in the case illustrated in FIG. 1, for example.

In the present embodiment, in the case where the vehicle-to-object distance L is less than or equal to a set vehicle-to-object distance Lth, and the object-side distance dv is less than or equal to a first set object-side distance dvth1 (a positive value), and an approach velocity SV as the relative velocity is greater than or equal to a set approach velocity SVth, it is determined that the object X and the own vehicle 8 have a predetermined specific relationship, and the object X is set as a specific object OV. In the case where the specific object OV is present, it is estimated that the driver is to perform a steering operation in a direction in which the own vehicle 8 avoids the specific object OV, and it is estimated that the own vehicle 8 is to avoid the specific object OV. In other words, the specific relationship may be a relationship in which it is estimated that the steering operation in the direction in which the own vehicle 8 avoids the specific object OV is to be performed.

When the object-side distance dv is short, the driver more easily feels a high necessity for the own vehicle 8 to avoid the object X, than when the object-side distance dv is long. The first set object-side distance dvth1 may be set to such a distance that it is estimated that the steering operation in the direction in which the own vehicle 8 avoids the object X is to be performed by the driver. It is known that the first set object-side distance dvth1 is about 30 cm in general.

It is possible to consider that the driver has a higher necessity of performing the steering operation in the direction in which the own vehicle 8 avoids the specific object OV, when the vehicle-to-object distance is short, and the approach velocity is high than when the vehicle-to-object distance is long, and the approach velocity is low. Thus, each of the set vehicle-to-object distance Lth and the set approach velocity SVth may be set to such a value that it is considered that there is a high necessity for the driver to perform the steering operation in the direction in which the own vehicle 8 avoids the specific object OV, for example. For example, it is known that the set vehicle-to-object distance Lth and the set approach velocity SVth are about 50 m and about 30 km/h, respectively, in general.

When the object-side distance dv is greater than or equal to a second set object-side distance dvth2 (a negative value), it is determined that the object X is present on a front right side or a front left side of the own vehicle 8. The case where the object-side distance dv is less than or equal to the first set object-side distance dvth1 includes a case where at least a portion of the object X is located in the own lane. However, in the case where more than half of the object X is located in the own lane, for example, it may be difficult to determine whether the object X is located on a front right side of the own vehicle 8 and whether the object X is located on a front left side of the own vehicle 8, and it may be difficult to determine whether the steering operation for avoiding the object X is to be performed in the right direction or the left direction. To overcome this problem, in the present embodiment, when the object-side distance dv is greater than or equal to the second set object-side distance dvth2, it is determined that the object X is present on a front right side or a front left side of the own vehicle 8, and when the object-side distance dv is less than the second set object-side distance dvth2, it is determined that the object X is located in front of the own vehicle 8. It is noted that the second set object-side distance dvth2 may be about −50 cm in general.

In the case where the specific object OV is a large or high object such as a large vehicle or a sound-proof wall, the driver feels a strong pressure when compared with the case where the specific object OV is a compact vehicle or a guard rail, for example. In the case where the driver feels a strong pressure, the driver easily feels that the specific object OV is located near the own vehicle even if the object-side distance dv is the same. Thus, the driver strongly feels that there is a high necessity of performing the steering operation such that the own vehicle 8 avoids the specific object OV. Accordingly, in the case where the specific object OV is a large or high object, the first set object-side distance dvth1 may be set to a larger value, or the object-side distance dv may be corrected to a small value, for example, than in the case where the specific object OV is not a large or high object.

The target-traveling-line setter 44 is configured to set the target traveling line Cref in the case where the LKA control is executed. The target-traveling-line setter 44 includes a central-target-traveling-line setter 54, an offset-target-traveling-line setter 56, and a return-target-traveling-line setter 58. In the case where the specific object OV is absent, the target traveling line Cref is set to the substantially center of the own lane S by the central-target-traveling-line setter 54. In contrast, in the case where the specific object OV is present, and the driver has performed the steering operation in the direction in which the own vehicle 8 avoids the specific object OV, it is determined that an offset initiating condition is established. The target traveling line Cref is set by the offset-target-traveling-line setter 56 to the offset position shifted from the center of the own lane S in the same direction as the direction of the steering operation performed by the driver. In the following description, the target traveling line Cref set to the offset position may be referred to as "offset target traveling line", and the target traveling line Cref set to the substantially center may be referred to as "central target traveling Cref". The central target traveling line Cref is in most cases set to a center line C extending through the substantially center of the own lane S.

Figure 10:
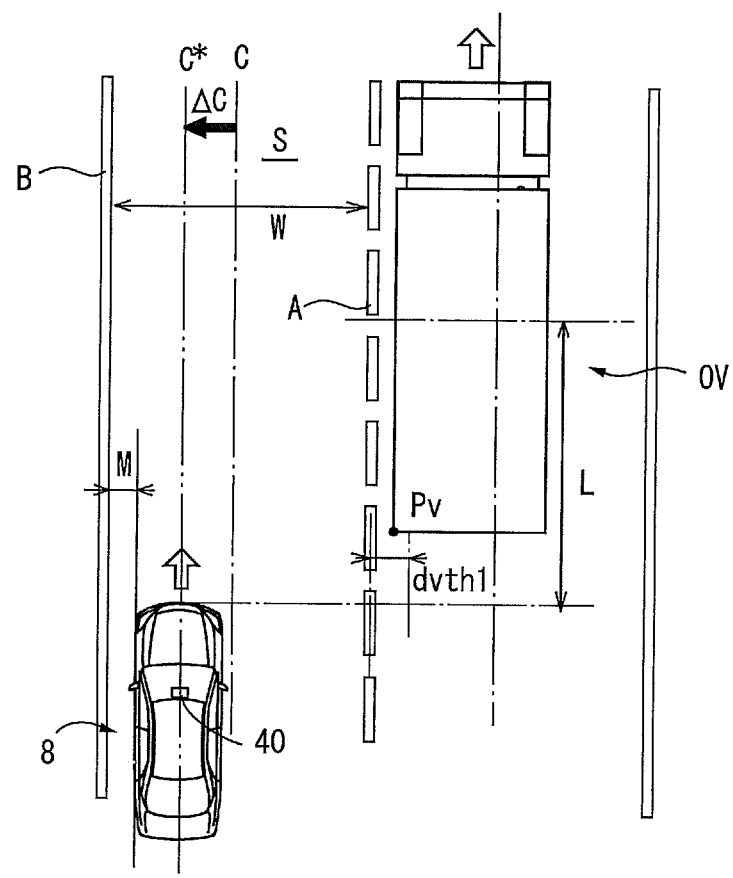
FIG. 10 is a view illustrating an amount of offset of the target traveling line for the own vehicle.

The offset-target-traveling-line setter 56 includes an offset-amount determiner 59. The offset-amount determiner 59 is configured to determine an amount $\Delta C$ of offset (shift) of the target traveling line Cref in the case where the offset initiating condition is satisfied. When the offset amount $\Delta C$ is determined, an offset target traveling line Cref is set. In the present embodiment, as illustrated in FIG. 10, the offset amount $\Delta C$ is determined based on the width W of the own lane S and a margin M. The width W of the own lane S may be a distance between the lane lines A, B defining the own lane S which are recognized by the lane-line recognizer 50 and may be obtained based on navigation information. The target traveling line Cref is set to such a position that the own vehicle 8 does not lie off a line that is located inside the lane line B by a distance of the margin M. The lane line B is located on an opposite side of the own lane S from the specific object OV. For example, in the case where the width of the own vehicle 8 is defined to Z, the target traveling line Cref is set to the offset position located on an inner side of the lane line B by the distance (M+Z/2). The amount $\Delta C$ of offset from a position (center) set as a central target traveling line C is determined according to the following expression:

$$|\Delta C|=W/2-(M+Z/2)$$

It is noted that the offset amount $\Delta C$ is represented as a positive value in the case where the offset position is located to the right of the central target traveling line C, and the offset amount $\Delta C$ is represented as a negative value in the case where the offset position is located to the left of the central target traveling line C.

The return-target-traveling-line setter 58 is configured to set the target traveling line Cref in the case where the target traveling line Cref is returned from the offset position to the center of the own lane S. In the present embodiment, the target traveling line Cref is gradually brought closer to the center. The shift of the target traveling line Cref from the center to the offset position is performed in the same direction as the direction of the steering operation of the driver in the state in which the driver feels that there is a high necessity of bringing the own vehicle 8 away from the specific object OV. Thus, the driver feels little not-normal feeling even when the shift is performed speedily. In contrast, in the case where the target traveling line Cref is returned from the offset position to the center, the driver in many cases does not feel that there is a high possibility of speedily returning the own vehicle 8 to the center. Thus, in the case where the target traveling line Cref is speedily moved from the offset position to the center, there is a high possibility that the driver feels the not-normal feeling. To solve this problem, in the present embodiment, the target traveling line Cref is moved more slowly when the target traveling line Cref is returned from the offset position to the center than when the target traveling line Cref is moved from the center to the offset position. In the present embodiment, the target traveling line Cref is moved stepwise according to the following expressions:

$$\Delta C = \Delta C \pm \alpha$$

$$Cref = C + \Delta C$$

$\alpha$ is a positive value which represents an amount of movement of the target traveling line Cref in each execution of a target-traveling-line setting program which will be described below. The offset amount $\Delta C$ is gradually brought closer to zero, and the target traveling line Cref is gradually brought closer to the center. It is noted that, even when $\Delta C$ is changed by the amount of movement $\alpha$ in each change, $\Delta C$ is not always changed to exactly zero. Thus, in the present embodiment, in the case where the absolute value $|\Delta C|$ of the offset amount is less than a set value B (which may be less than the value $\alpha$, for example), it is determined that the target traveling line Cref is the center, and the target traveling line Cref is changed to the center line C (Cref=C).

Figure 7:
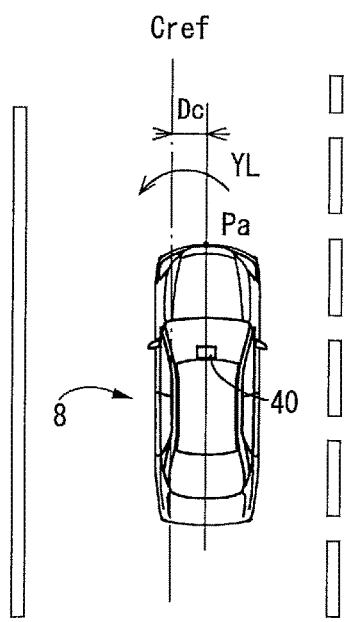
FIG. 7 is a view illustrating a center distance for the own vehicle.

As illustrated in FIG. 2, the LKA controller 46 includes a center-LKA controller 60 as a center support controller, an offset-LKA controller 62 as an offset support controller, a return-LKA controller 64 as a return-support controller, and an offset-LKA terminator 66 as an offset support terminator. In the LKA control, as illustrated in FIG. 7, the LKA controller 46 obtains a center distance Dc that is a distance between the target traveling line Cref and a predetermined reference point Pa of the own vehicle 8 (which is a point on a center line of the own vehicle 8 in its widthwise direction). Steering torque is then applied to the steering mechanism such that the center distance Dc becomes zero. The center distance Dc takes a positive value when the own vehicle 8 is located to the right of the target traveling line Cref, and the center distance Dc takes a negative value when the own vehicle 8 is located to the left of the target traveling line Cref. For example, when the own vehicle 8 travels on a portion of the own lane S which is located to the right of the target traveling line Cref, as indicated by the arrow YL, the steering torque (represented as a negative value) in the left direction is applied to the steering mechanism, and when the own vehicle 8 travels on a portion of the own lane S which is located to the left of the target traveling line Cref, the steering torque in the right direction is applied to the steering mechanism. As a result, the driving support is performed such that the own vehicle 8 travels on the target traveling line Cref. The magnitude of the steering torque applied to the steering mechanism is larger when the absolute value of the center distance Dc is large than when the absolute value of the center distance Dc is small.

The center-LKA controller 60 is configured to execute the LKA control based on the central target traveling line Cref (=C). The offset-LKA controller 62 is configured to execute the LKA control based on the offset target traveling line Cref. The return-LKA controller 64 is configured to execute the LKA control based on the target traveling line Cref set by the return-target-traveling-line setter 58.

Figure 6:
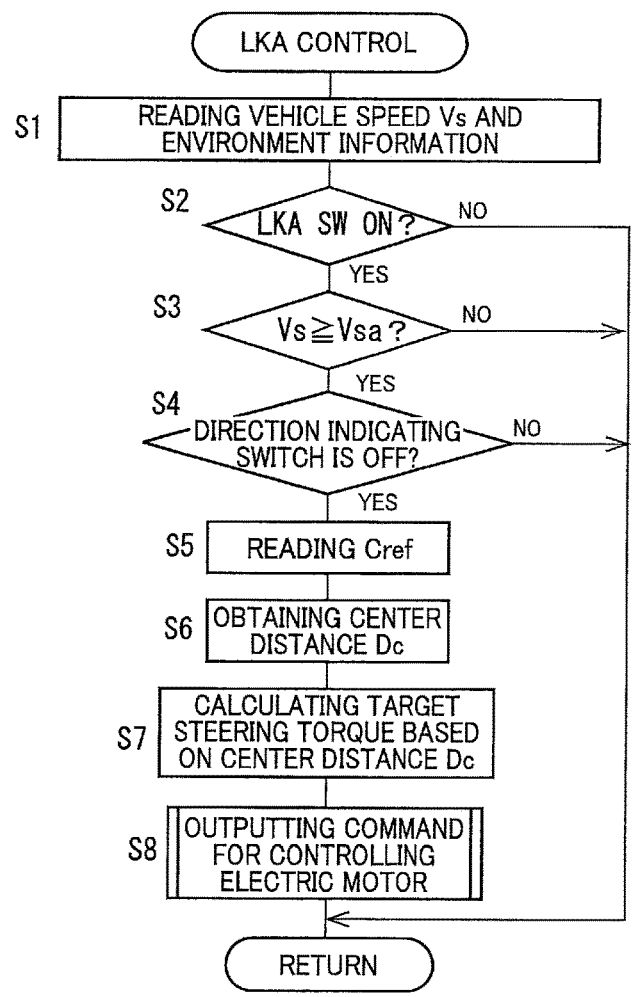
FIG. 6 is a flow chart representing a procedure of a lane-keep-assist (LKA) control program stored in the storage.

The LKA control is executed according to the LKA control program represented by the flow chart in FIG. 6. The LKA control program is executed in a cycle of a predetermined time. This flow begins with S1 at which the vehicle speed Vs, environment information, and other information are obtained. At S2, it is determined whether the LKA switch 41 is ON. The environment information is obtained by the environment obtainer 42. Examples of the environment information include: information representing a relative positional relationship between the own vehicle 8 and the object X located on a front or front lateral sides of the own vehicle 8; information representing the width of the own lane S; and information representing the shape of the road. When the LKA switch 41 is ON, it is determined at S3 whether the vehicle speed Vs of the own vehicle 8 is greater than or equal to a set vehicle speed Vsa that is the minimum speed of the own vehicle 8 for the LKA control. It is determined at S4 whether the direction indicating switch 16 is OFF. When positive decisions (YES) are made at S3 and S4, the target traveling line Cref is read at S5. The center distance Dc is obtained at S6. At S7, the direction and magnitude of the steering torque to be applied to the steering mechanism are calculated based on the center distance Dc. At S8, a command for controlling the electric motor 21 is output to the steering ECU 12. In the steering system 20, the steering ECU 12 controls the electric motor 21 to apply steering torque to the steering mechanism in a direction in which the own vehicle 8 is brought closer to the target traveling line Cref.

It is noted that the center distance Dc is always obtained as a distance between the center line C of the own lane S and the reference point Pa of the own vehicle 8. In the case where the target traveling line Cref is shifted, the center distance Dc may be corrected using the offset amount $\Delta C$ to obtain the center distance Dc used by the offset-LKA controller 62 and the return-LKA controller 64.

Figure 11:
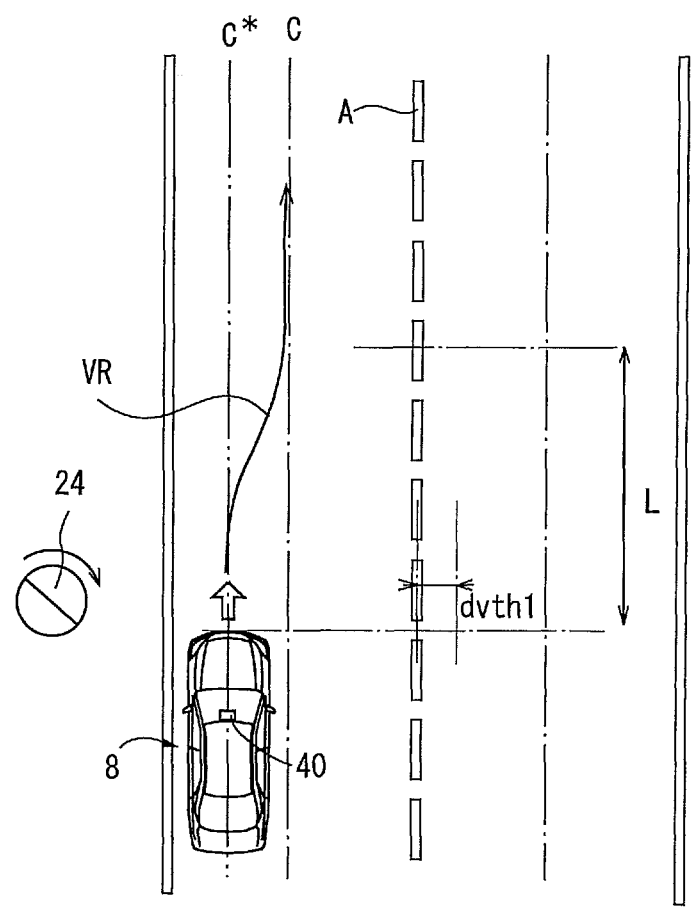
FIG. 11 is a view illustrating a state in which the offset terminating condition is satisfied.

The offset-LKA terminator 66 is configured to, when a predetermined offset terminating condition is satisfied, terminate control executed based on the offset target traveling line Cref (noted that this control may be hereinafter referred to as "offset LKA control"). Since it is not preferable that the own vehicle 8 travels on the target traveling line Cref spaced apart from the center of the own lane S in this case, the traveling state of the own vehicle 8 is preferably well returned to a state in which the own vehicle 8 travels on the center line C. FIG. 11 illustrates a state in which the specific object OV has disappeared (a first condition), the driver has performed a steering operation such that the own vehicle 8 travels toward the center of the own lane S as indicated by the solid line VR (a second condition), and the absolute value of the steering torque detected by the steering-torque sensor 26 is greater than or equal to a set torque Tbth set based on a no-hands determination threshold value (a third condition). In the present embodiment, when the first and second conditions are satisfied or when the first and third conditions are satisfied, it is determined that the offset terminating condition is satisfied, and the offset LKA control is terminated. This is because it is possible to consider that when the second condition is satisfied, the third condition is also satisfied.

Regarding the first condition, the driver feels the not-normal feeling when the offset LKA control is terminated in the case where the specific object OV is present. In the case where the specific object OV has disappeared, in contrast, the necessity of executing the offset LKA control is low. Thus, it is appropriate that the offset LKA control is terminated when the specific object OV has disappeared. Regarding the second condition, in the case where the control based on the offset target traveling line Cref is continuously executed even though the driver has performed the steering operation for returning the own vehicle 8 to the center of the own lane S, this control is against the intention of the driver. On the other hand, even in the case where it is determined by the camera 40 and the environment obtainer 42 that the specific object OV is absent, the object X is in some cases present at an area which is difficult to identify, that is, it is not appropriate in some cases to return the target traveling line Cref to the center line C. In contrast, in the case where the driver has performed a steering operation in a direction in which the own vehicle 8 is returned to the center line C, the specific object OV is absent obviously.

Figure 12A:
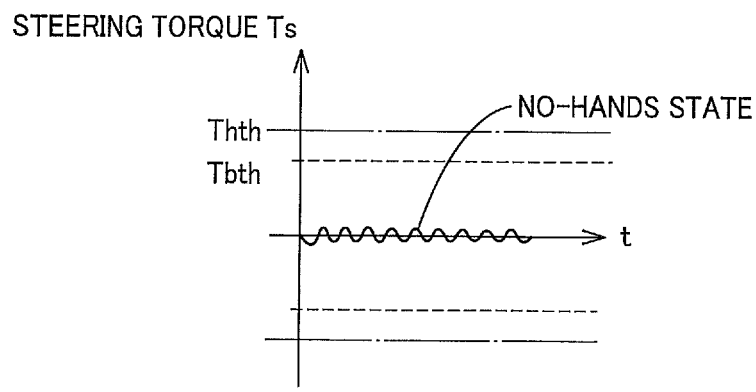
FIG. 12A is a view illustrating changes of steering torque in a no-hands state of the own vehicle.
Figure 12B:
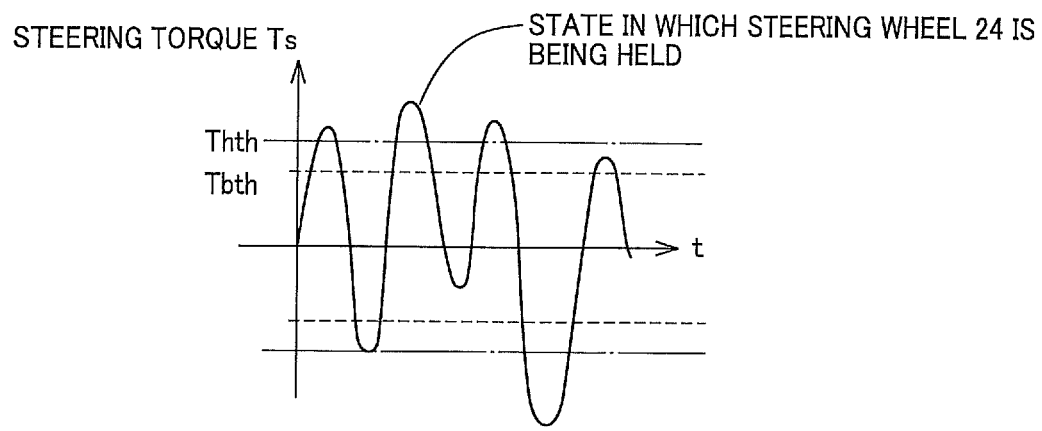
FIG. 12B is a view illustrating changes of steering torque in a state in which a steering wheel is held in the own vehicle.

Regarding the third condition, the set torque Tbth may be a value taken in the case where the driver is holding the steering wheel 24 lightly. As illustrated in FIG. 12A, when the driver releases his or her hands from the steering wheel 24, the absolute value of the steering torque becomes very small. On the other hand, as illustrated in FIG. 12B, the absolute value is large in a state in which the driver is holding the steering wheel 24. Since the steering wheel 24 and each of the steered road wheels are mechanically coupled to each other, a force received from a road surface via the steered road wheels is transmitted to the steering wheel 24. Thus, steering torque greater than a threshold value Thth is required to hold the steering wheel 24.

In the case where the set torque Tbth is made large, it becomes unpreferably more difficult for the offset LKA control to be terminated. To solve this problem, in the present embodiment, as illustrated in FIGS. 12A and 12B, the set torque is set to a value substantially equal to or less than the threshold value Thth to allow the offset terminating condition to be satisfied without driver's consciousness in a state in which the driver is lightly holding the steering wheel 24. It is noted that there is discussed inhibiting the driving support control in a no-hands state in which the driver is not touching the steering wheel 24, for example. In this case, the threshold value Thth is usually used to determine the no-hands state is established. The threshold value Thth is referred to as the no-hands determination threshold value and usually set to a value between 0.3 Nm and 0.4 Nm, for example.

The offset inhibitor 48 is configured to inhibit the shift of the target traveling line Cref in the case where there is a curve in front of the own lane S, for example, in the case where a distance between the own vehicle 8 and a starting point of the curve is less than or equal to a set distance. The inhibition of the shift of the target traveling line Cref includes at least one of inhibition of the shift of the target traveling line Cref by the target-traveling-line setter 44 and inhibition of the offset LKA control. The inhibition of the offset LKA control includes at least one of inhibition of a start of the offset LKA control and termination of the offset LKA control. In the case where the own vehicle 8 is traveling on the curve, the driver voluntarily applies steering torque to drive the own vehicle 8 in many cases. Thus, if it is determined that the steering operation performed by the driver is a steering operation of moving the own vehicle 8 away from the specific object OV, it is estimated that the target traveling line Cref is to be shifted in the direction of the steering operation, and this shift is in some cases against the intention of the driver on the contrary. Accordingly, in the present embodiment, in the case where there is a curve in front of the own lane S, the shift is inhibited until the own vehicle 8 passes through the curve. It is noted that the presence of the curve may be obtained based on an image taken by the camera 40 (the shape of the lane line) or based on the navigation information, for example.

Figure 3:
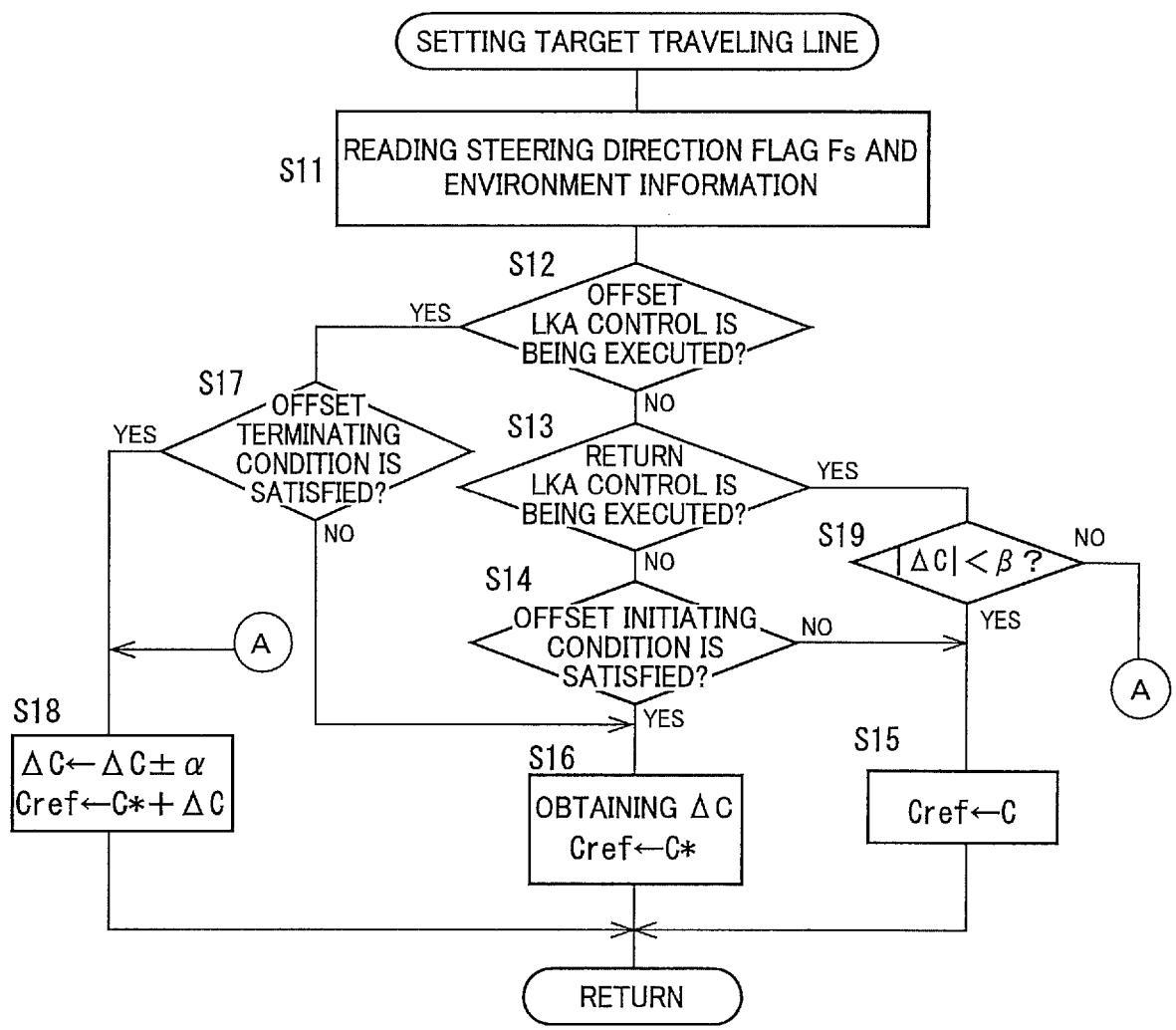
FIG. 3 is a flow chart representing a procedure of a target-traveling-line setting program stored in a storage of a driving support ECU of the own vehicle.

FIG. 3 is a flow chart representing a flow of the target-traveling-line setting program. In the own vehicle 8, the target-traveling-line setter 44 of the driving support ECU 10 executes the target-traveling-line setting program each time when a set length of time is elapsed. This flow begins with S11 at which the steering direction flag Fs, the environment information, and other information are read. It is determined at S12 whether the offset LKA control is being executed. At S13, it is determined whether the LKA control executed by the return-LKA controller 64 (hereinafter may be referred to as "return LKA control") is being executed. When negative decisions (NO) are made at S12 and S13, it is determined at 814 whether the offset initiating condition is satisfied. When the offset initiating condition is not satisfied, the target traveling line Cref is at S15 set to the center line C extending through the substantially center of the own lane S (Cref=C). While the offset initiating condition is not satisfied, the processings at S11-S15 are repeated, and the center-LKA controller 60 executes the LKA control based on the central target traveling line C (hereinafter may be referred to as "center LKA control").

When the offset initiating condition is satisfied, a positive decision (YES) is made at S14, this flow goes to S16 at which the offset amount ΔC is obtained, and the offset target traveling line Cref is set (Cref=C*). In this processing, the target traveling line Cref is shifted by the offset amount ΔC in the same direction as the direction of the steering operation performed by the driver. The offset LKA control is then executed. During the offset LKA control, a positive decision (YES) is made at S12, and it is determined at S17 whether the offset terminating condition is satisfied. When the offset terminating condition is not satisfied, this flow goes to S16. Until the offset terminating condition is thereafter established, the processings S11, S12, S17, and S16 are repeated to execute the offset LKA control. In the present embodiment, the target traveling line Cref is kept constant during the offset LKA control.

When the offset terminating condition is satisfied, a positive decision (YES) is made at S17, and the target traveling line Cref is set by the return-target-traveling-line setter 58 at S18. In this processing, the target traveling line Cref is gradually brought closer to the center line C. In this case, the offset LKA control is terminated, and the return LKA control is executed. Thereafter, a negative decision (NO) is made at S12, a positive decision (YES) is made at S13, and it is determined at S19 whether the return LKA control is finished. In the present embodiment, it is determined whether the absolute value |ΔC| of the offset amount becomes less than the value B. While a negative decision (NO) is made at S19, the processings at S11, S12, S13, S19, and S18 are repeated, and the return LKA control is executed. When the absolute value |ΔC| of the offset amount is close to zero, and the target traveling line Cref is made close to the center line C, a positive decision (YES) is made at S19. In this case, it is determined that the return LKA control is finished, and the target traveling line Cref is set to the center line C at S15 to execute the center LKA control.

Figure 4:
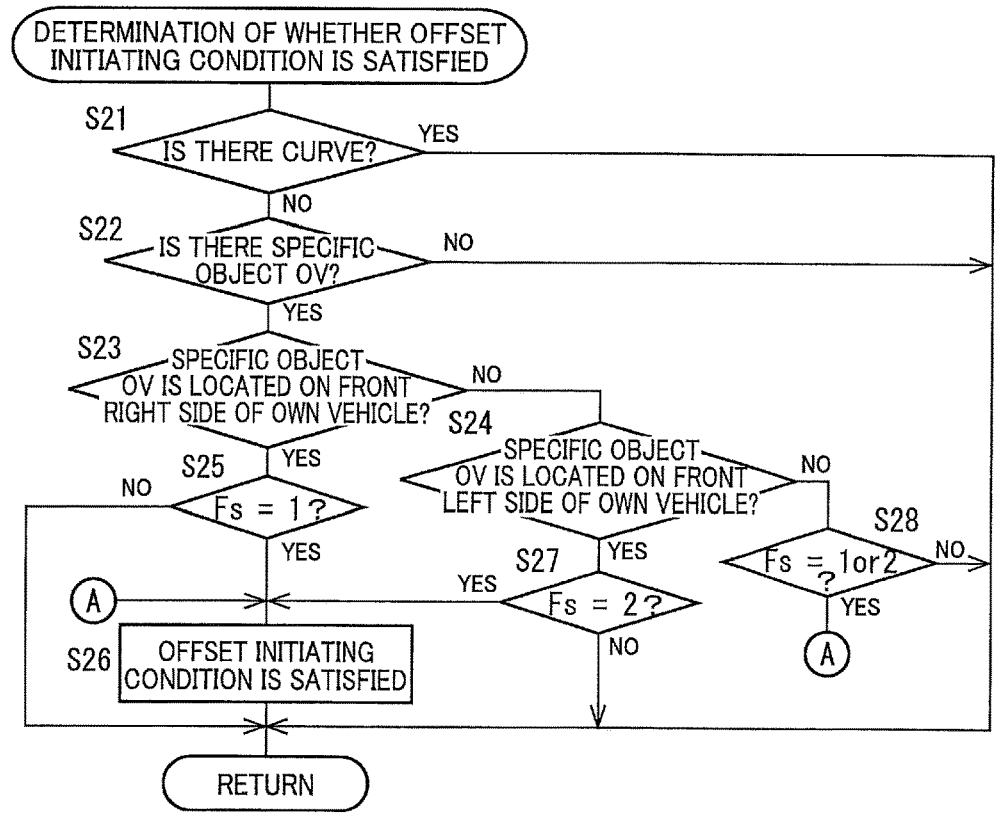
FIG. 4 is a flow chart representing a procedure of a portion of the program which represents determination of whether an offset initiating condition is satisfied.
Figure 8:
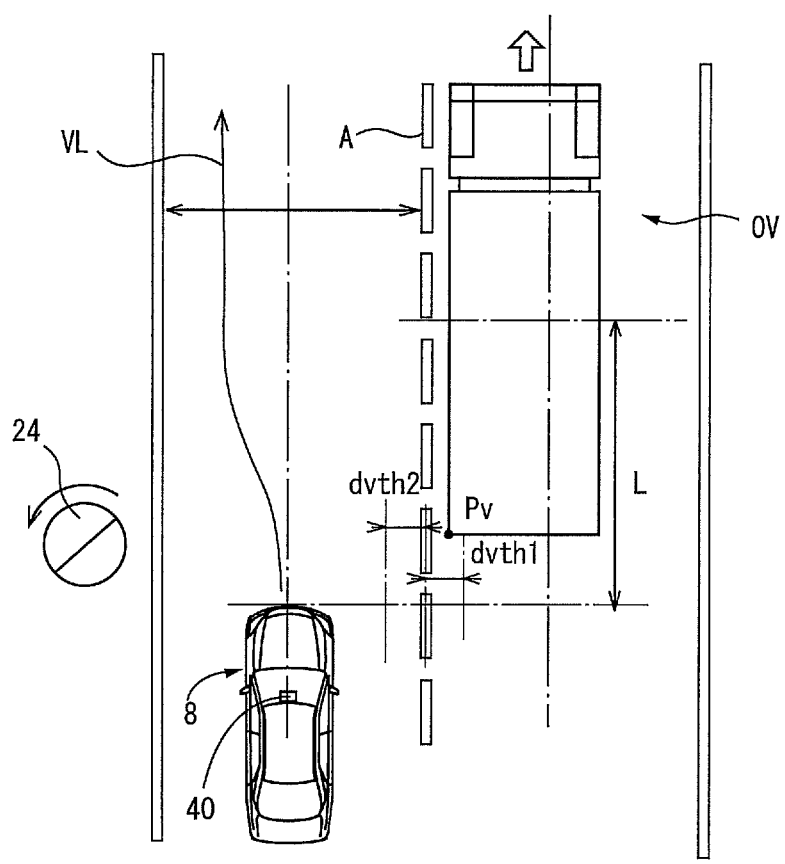
FIG. 8 is a view illustrating a running state of the own vehicle in the case where there is a specific object for the own vehicle.
Figure 9:
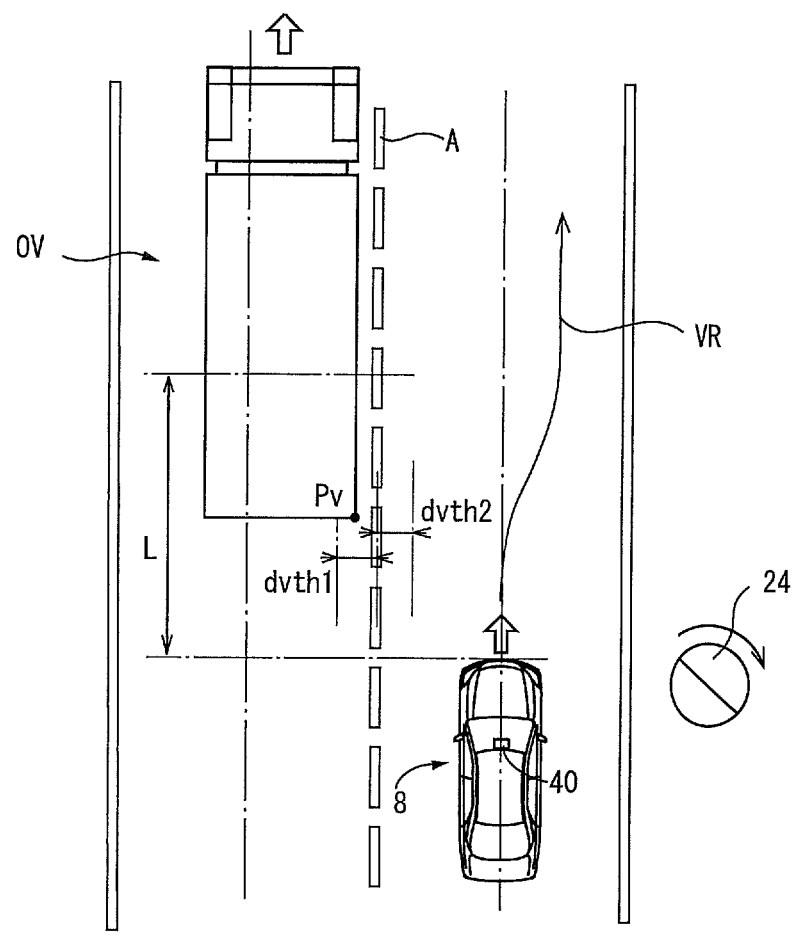
FIG. 9 is a view illustrating a running state of the own vehicle in the case where there is another specific object for the own vehicle.

FIG. 4 is a flow chart representing a flow of the processing at S14 (determination of whether the offset initiating condition is satisfied). This flow begins with S21 at which it is determined whether there is a curve, based on the environment information read at S11. It is determined at S22 whether the specific object OV is present. When there is no curve, and the specific object OV is present, it is determined at S23 whether the specific object OV is located on a front right side of the own vehicle 8, and it is determined at S24 whether the specific object OV is located on a front left side of the own vehicle 8. For example, as illustrated in FIG. 8, when the specific object OV is located on a front right side of the own vehicle 8, it is determined at S25 whether the steering direction flag Fs is 1. That is, it is determined whether the direction of the steering operation performed by the driver is left. When a positive decision (YES) is made at S25, the specific object OV is located on a front right side of the own vehicle 8, and accordingly it is determined that the driver has performed a leftward steering operation. In this case, it is determined at S26 that the offset initiating condition is satisfied. In contrast, as illustrated in FIG. 9, when the specific object OV is located on a front left side of the own vehicle 8, it is determined at S27 whether the steering direction flag Fs is 2. That is, it is determined whether the direction of the steering operation performed by the driver is right. When a positive decision (YES) is made at S27, the specific object OV is located on a front left side of the own vehicle 8, accordingly it is determined that the driver has performed a rightward steering operation. In this case, it is determined at S26 the offset initiating condition is satisfied.

When negative decisions (NO) are made at S23 and S24, that is, when the specific object OV is located in front of the own vehicle 8, it is determined at S28 whether the steering direction flag Fe is one of 1 and 2. When the steering direction flag Fs is one of 1 and 2, it is determined at S26 that the offset initiating condition is satisfied. It is estimated that the driver is to perform a rightward or leftward steering operation such that the own vehicle 8 avoids the specific object OV. It is further estimated that the center LKA control is to be executed in this steering operation. As a result, it is estimated that the driver feels the not-normal feeling. Thus, it is appropriate that the target traveling line Cref is shifted regardless of whether the driver has performed a rightward steering operation or a leftward steering operation in the case where the specific object OV is present in front of the own vehicle 8.

The offset initiating condition is not satisfied in the other cases, that is, in the case where the specific object OV is present on a front right side of the own vehicle 8, and a leftward steering operation is not performed (S25: NO), in the case where the specific object OV is present on a front left side of the own vehicle 8, and a rightward steering operation is not performed (S27: NO), and in the case where the specific object OV is present in front of the own vehicle 8, and a steering operation for avoiding the specific object OV is not performed (when a negative decision (NO) is made at S28, it is estimated that the driver has not performed the steering operation for avoiding the specific object OV and decelerated the own vehicle 8 by a braking operation, for example).

Figure 5:
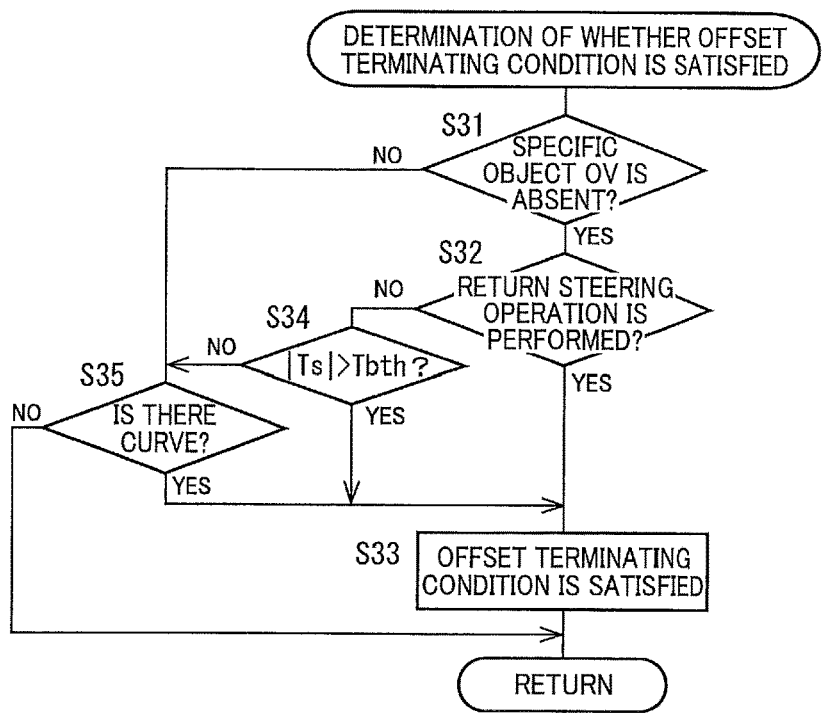
FIG. 5 is a flow chart representing a procedure of another portion of the program which represents determination of whether an offset terminating condition is satisfied.

FIG. 5 is a flow chart representing a flow of the processing at S17 (determination of whether the offset terminating condition is satisfied). This flow begins with S31 at which it is determined whether the specific object OV is absent. It is determined at S32 whether the driver has performed a steering operation in the direction in which the own vehicle 8 is returned toward the center of the own lane S (hereinafter may be referred to as "return steering operation"). When positive decisions (YES) are made at S31 and S32, it is determined at S33 that the offset terminating condition is satisfied. When the return steering operation is not performed, it is determined at S34 whether the absolute value of the steering torque detected by the steering-torque sensor 26 is greater than or equal to the set torque Tbth. When the absolute value of the steering torque is greater than or equal to the set torque Tbth (S34: YES), it is also determined at S33 that the offset terminating condition is satisfied. When a negative decision (NO) is made at S34 or when a negative decision (NO) is made at S31, it is determined at S35 whether there is a curve. Where the curve is present, a positive decision (YES) is made at S35, it is determined at S33 that the offset terminating condition is satisfied. When the curve is present in front of the own vehicle 8, it is determined that the offset terminating condition is satisfied, even when the negative decision (NO) is made at S31 or when the negative decisions (NO) are made at S32 and S34.

In the present embodiment as described above, the target traveling line Cref is shifted when the specific object OV is present and when the driver has performed the steering operation such that the own vehicle 8 avoids the specific object OV. This processing reduces the not-normal feeling given to the driver. In the case where the specific object OV has disappeared, for example, the offset LKA control is terminated, and the offset target traveling line Cref is returned to the center line C. This processing avoids unnecessary increase in time of the offset LKA control and enables good return to the center LKA control. In the case where the target traveling line Cref is returned from the offset position to the center, the offset target traveling line Cref is gradually brought closer to the center line C. This processing makes it difficult for the driver to feel the not-normal feeling when the offset LKA control is switched to the center LKA control.

In the present embodiment, the steering system 20 is one example of a supporting device. The driving support ECU 10 is one example of a support controller. The driving supporter is constituted by devices including the steering system 20, the driving support ECU 10, and the camera 40. The target-traveling-line setter 44 is constituted by portions of the driving support ECU 10 which store and execute the target-traveling-line setting program. The central-target-traveling-line setter 54 is constituted by portions of the driving support ECU 10 which store and execute the processing at S15 in the target-traveling-line setting program. The offset-amount determiner 59 and the offset-target-traveling-line setter 56 are constituted by portions of the driving support ECU 10 which store and execute the processing at S16 in the target-traveling-line setting program. The return-target-traveling-line setter 58 is constituted by portions of the driving support ECU 10 which store and execute the processing at S18 in the target-traveling-line setting program. The first set object-side distance dvth1 is one example of a set object-side distance. The camera 40 is one example of an object-information obtainer.

The supporting device is constituted by the steering system 20 in the above-described embodiment but may be constituted by the notifying device 18. In the case where the supporting device is constituted by the notifying device 18, when the specific object OV is present and when the steering operation is performed such that the own vehicle 8 deviates from the target traveling line Cref, the notifying device 18 is operated, which may annoy the driver. In the present embodiment, however, the target traveling line Cref is shifted to reduce operations of the notifying device 18. This reduction reduces driver's annoyance.

An amount of offset of the target traveling line Cref in the case where the offset initiating condition is satisfied may be determined based on the steering torque applied by the driver. For example, the offset amount may be increased in the case where the steering torque is large than in the case where the steering torque is small, and limitation may be imposed on the offset amount such that the shifted traveling line is not located outside the target traveling line Cref determined based on the margin M.

The driving supporter includes a plurality of computers in the above-described embodiment but may include a single computer.

The target traveling line may be moved toward an opposite side of the own vehicle 8 from the specific object OV, regardless of the direction of the steering operation performed by the driver. For example, the present driving supporter may be configured such that the target traveling line is moved to a left side of the own vehicle 8 in the case where the specific object OV is located on a front right side of the own vehicle 8, and the target traveling line is moved to a right side of the own vehicle 8 in the case where the specific object OV is located on a front left side of the own vehicle 8. While the embodiment has been described above, it is to be understood that the disclosure is not limited to the details of the illustrated embodiment, but may be embodied with various changes and modifications, which may occur to those skilled in the art, without departing from the spirit and scope of the disclosure.

Claimable Inventions

There will be described claimable inventions in the following forms.

(1) A driving supporter, comprising:
a supporting device configured to perform support of driving;
an object-information obtainer configured to obtain object information relating to at least an object in an area;
an environment obtainer configured to obtain an environment located in the area; and
a support controller configured to, based on the obtained environment located in the area, control the supporting device to perform the support of the driving such that the own vehicle travels along a target traveling line,
wherein the environment obtainer includes a relative-positional-relationship obtainer configured to obtain, as the environment located in the area, a relative positional relationship between the own vehicle and the object detected based on the object information obtained by object-information obtainer, and
wherein the support controller comprises an offset-target-traveling-line setter configured to set, when the relative positional relationship obtained by the relative-positional-relationship obtainer is a specific relationship in which it is estimated that the steering operation in a direction in which the own vehicle avoids the object is to be performed, the target traveling line to an offset position that is shifted in a direction identical to a direction of a steering operation from a position of the target traveling line which is located when the relative positional relationship obtained by the relative-positional-relationship obtainer is not the specific relationship.

The environment obtainer is configured to obtain information, such as the object, lane lines, and a state of a road in the area, based on at least one of image data obtained by a camera and a signal obtained by a device such as a radar device and a laser and configured to obtain, as the environment located in the area, information such as the relative positional relationship between the object and the own vehicle, a relative positional relationship between the object and a lane line, a distance between the lane lines, and a shape of a road in front of the own vehicle. The distance between the lane lines (i.e., the width of an own lane) may be obtained based on information relating to navigation, regardless of the image data and the signals output from the radar device and the laser, for example. The offset position is set at a position deviated from a position of the target traveling line which is located in the case where the object is not the specific object. The target traveling line in the case where the object is not the specific object (which case includes a case where no object is detected in the area) is in most cases set at a center of the own lane in the widthwise direction. In other words, the target traveling line is in most cases set to a center line extending through the center of the own lane in the widthwise direction.

(2) The driving supporter according to the above form (1), wherein the offset-target-traveling-line setter is configured to determine that the relative positional relationship obtained by the relative-positional-relationship obtainer is the specific relationship and set the target traveling line to the offset position when the relative positional relationship is a relationship in which an object-side distance that is a distance between the object and a lane line defining an own lane on which the own vehicle is traveling is less than or equal to a set object-side distance and when the relative positional relationship is at least one of (a) a relationship in which a vehicle-to-object distance between the object and the own vehicle is less than or equal to a set vehicle-to-object distance and (b) a relationship in which the own vehicle is approaching the object at a speed greater than or equal to a set speed.

(3) The driving supporter according to the above form (1) or (2), wherein the offset-target-traveling-line setter is configured to set the target traveling line to the offset position when the relative positional relationship is the specific relationship and when the driver has performed the steering operation in the direction in which the own vehicle avoids the object.

An operation-state obtainer is configured to obtain whether the steering operation in the direction in which the own vehicle avoids the object is performed. In the above-described embodiment, the operation-state obtainer is constituted by devices including the steering-torque sensor 26, a steering direction flag Fs, and the steering ECU 12 configured to set the steering direction flag Fs.

(4) The driving supporter according to any one of the above forms (1) through (3), wherein the support controller comprises a central-target-traveling-line setter configured to, when the relative positional relationship is not the specific relationship, set the target traveling line to a center of an own lane in a widthwise direction thereof, the own lane being a lane on which the own vehicle is traveling.

(5) The driving supporter according to the above form (4), wherein the offset-target-traveling-line setter is configured to set the target traveling line by setting, as the offset position, a position shifted by a predetermined offset amount in the widthwise direction from the center of the own lane, to which the target traveling line is set by the central-target-traveling-line setter.

The offset amount as a distance between the offset position and the position to which the target traveling line is set by the central-target-traveling-line setter may be a predetermined fixed value or a variable value.

(6) The driving supporter according to the above form (4) or (5),
wherein the environment obtainer is configured to obtain a width of the own lane as the environment located in the area, and the width of the own lane is a distance between lane lines respectively defining opposite edges of the own lane, and wherein the offset-target-traveling-line setter comprises an offset-amount determiner configured to determine an offset amount based on at least one of the width of the own lane which is obtained by the environment obtainer and a state of the steering operation performed by the driver, and the offset amount is a distance between the offset position and the center of the own lane in the widthwise direction thereof, to which the target traveling line is set by the central-target-traveling-line setter.

For example, the offset amount may be determined based on the width of the own lane, the width of the own vehicle, and a margin and may be determined based on a steering speed and an amount of operation which represent the state of the steering operation performed by the driver. A rough width of the own lane is determined in advance by, e.g., a road type, and accordingly the offset amount may be a fixed value.

(7) The driving supporter according to the above forms (4) through (6), wherein the support controller comprises:

a center support controller configured to, when the relative positional relationship is not the specific relationship, control the supporting device based on the target traveling line set by the central-target-traveling-line setter; and an offset support controller configured to, when the relative positional relationship is the specific relationship, control the supporting device based on the target traveling line set by the offset-target-traveling-line setter.

(8) The driving supporter according to the above form (7), wherein the support controller comprises an offset support terminator configured to terminate control of the offset support controller when at least one of four cases is established: (i) a case where the object for which the relative positional relationship is the specific relationship is not present; (ii) a case where the driver has performed a steering operation in a direction in which the own vehicle is brought closer to the center of the own lane; (iii) a case where steering torque representing the state of the steering operation performed by the driver is greater than or equal to a set torque determined based on no-hands determination torque; and (iv) a case where a road in front of the own vehicle curves.

For example, the control of the offset support controller may be terminated at least when any one of the cases (i), (ii), and (iv) is established, the cases (i) and (iii) are established, or the cases (i) and (ii) are established, for example.

(9) The driving supporter according to the above form (7) or (8), wherein the support controller comprises:

a return-target-traveling-line setter configured to gradually bring the target traveling line from the offset position toward the center of the own lane when control of the offset support controller is finished; and a return-support controller configured to control the supporting device based on the target traveling line set by the return-target-traveling-line setter.

(10) The driving supporter according to the above form (9), wherein the return-target-traveling-line setter is configured to move the target traveling line from the offset position to the center gently when compared with a case where the target traveling line is moved from the center to the offset position.

(11) The driving supporter according to any one of the above forms (1) through (10), wherein the environment obtainer is configured to obtain a shape of a road in front of the own vehicle, as the environment located in the area, and wherein the support controller comprises an offset inhibitor configured to inhibit the offset-target-traveling-line setter from setting the target traveling line to the offset position when the environment obtainer obtains a curved shape as the shape of the road in front of the own vehicle.

The inhibition of the setting of the target traveling line to the offset position may include inhibition (termination) of support control based on the target traveling line set to the offset position.

What is claimed is:

1. A driving supporter, comprising:
   a supporting device configured to perform support of driving;
   an object-information obtainer configured to obtain object information relating to at least an object in an area; and
   an electronic control unit including
   an environment obtainer configured to obtain an environment located in the area; and
   a support controller configured to, based on the obtained environment located in the area, control the supporting device to perform the support of the driving such that an own vehicle travels along a target traveling line,
   wherein the environment obtainer includes a relative-positional-relationship obtainer configured to obtain, as the environment located in the area, a relative positional relationship between the own vehicle and an object detected based on the object information obtained by the object-information obtainer, and
   wherein the support controller comprises an offset-target-traveling-line setter configured to set, when the relative positional relationship obtained by the relative-positional-relationship obtainer is a specific relationship in which it is estimated that a steering operation in a direction in which the own vehicle avoids the object is to be performed, the target traveling line to an offset position that is shifted in a direction identical to a direction of the steering operation from a position of the target traveling line which is located when the relative positional relationship obtained by the relative-positional-relationship obtainer is not the specific relationship.

2. The driving supporter according to claim 1, wherein the offset-target-traveling-line setter is configured to determine that the relative positional relationship obtained by the relative-positional-relationship obtainer is the specific relationship and set the target traveling line to the offset position when the relative positional relationship is (i) a relationship in which an object-side distance that is a distance between the object and a lane line defining an own lane on which the own vehicle is traveling is less than or equal to a set object-side distance and (ii) at least one of (a) a relationship in which a vehicle-to-object distance between the object and the own vehicle is less than or equal to a set vehicle-to-object distance and (b) a relationship in which the own vehicle is approaching the object at a speed greater than or equal to a set speed.

3. The driving supporter according to claim 1, wherein the offset-target-traveling-line setter is configured to set the target traveling line to the offset position when the relative positional relationship is the specific relationship and when a driver has performed the steering operation in the direction in which the own vehicle avoids the object.

4. The driving supporter according to claim 1,
wherein the environment obtainer is configured to obtain, as the environment located in the area, a width of an own lane on which the own vehicle is traveling, and the width of the own lane is a distance between lane lines respectively defining opposite edges of the own lane,
wherein the support controller comprises a central-target-traveling-line setter configured to, when the relative positional relationship is not the specific relationship, set the target traveling line to a center of the width of the own lane which is obtained by the environment obtainer, and
wherein the offset-target-traveling-line setter comprises an offset-amount determiner configured to determine an offset amount based on at least one of the width of the own lane which is obtained by the environment obtainer and a state of the steering operation performed by a driver, and the offset amount is a distance between the offset position and the center of the width of the own lane, to which the target traveling line is set by the central-target-traveling-line setter.

5. The driving supporter according to claim 4, wherein the support controller comprises:
a center support controller configured to, when the relative positional relationship is not the specific relationship, control the supporting device based on the target traveling line set by the central-target-traveling-line setter; and
an offset support controller configured to, when the relative positional relationship is the specific relationship, control the supporting device based on the target traveling line set by the offset-target-traveling-line setter.

6. The driving supporter according to claim 5, wherein the support controller comprises an offset support terminator configured to terminate control of the offset support controller when at least one of four cases is established: (i) a case where the object for which the relative positional relationship is the specific relationship is not present; (ii) a case where the driver has performed a steering operation in a direction in which the own vehicle is brought closer to a center of the own lane; (iii) a case where steering torque representing the state of the steering operation performed by the driver is greater than or equal to a set torque determined based on no-hands determination torque; and (iv) a case where a road in front of the own vehicle curves.

7. The driving supporter according to claim 5, wherein the support controller comprises:
a return-target-traveling-line setter configured to bring the target traveling line from the offset position toward the center of the own lane when control of the offset support controller is finished; and
a return-support controller configured to control the supporting device based on the target traveling line set by the return-target-traveling-line setter.

8. The driving supporter according to claim 1,
wherein the environment obtainer is configured to obtain a shape of a road in front of the own vehicle, as the environment located in the area, and
wherein the support controller comprises an offset inhibitor configured to inhibit the offset-target-traveling-line setter from setting the target traveling line to the offset position when the environment obtainer obtains a curved shape as the shape of the road in front of the own vehicle.

\* \* \* \* \*